United States Patent [19]
Diamond

[11] 3,814,562
[45] June 4, 1974

[54] VACUUM FORMING APPARATUS
[75] Inventor: Harvey J. Diamond, Charlotte, N.C.
[73] Assignee: Plasti-Vac, Inc., Charlotte, N.C.
[22] Filed: Mar. 13, 1972
[21] Appl. No.: 234,060

[52] U.S. Cl................................ 425/174.4, 425/388
[51] Int. Cl.............................................. B29f 5/00
[58] Field of Search........... 425/388, 450, DIG. 205, 425/326, 174.4

[56] References Cited
UNITED STATES PATENTS

| | | | |
|---|---|---|---|
| 2,877,531 | 3/1959 | Heine | 425/DIG. 35 |
| 3,025,566 | 3/1962 | Kostur | 425/388 |
| 3,256,565 | 6/1966 | Alesi et al. | 425/388 X |
| 3,368,243 | 2/1968 | Kohen | 425/388 |
| 3,422,522 | 1/1969 | Mojonnier | 425/388 X |
| 3,649,152 | 3/1972 | Knack | 425/388 |
| 3,659,991 | 5/1972 | Diamond | 425/174 |

Primary Examiner—Richard B. Lazarus
Attorney, Agent, or Firm—Parrott, Bell, Seltzer, Park & Gibson

[57] ABSTRACT

Apparatus and method for vacuum forming sheets of thermoplastic material in which first and second sheet supporting and transporting means are employed for moving sheets of thermoplastic material between a heating means and respective first and second vacuum forming means for heating and softening of the sheets by the heating means and thereafter vacuum forming by the respective vacuum forming means. The heating means includes a pair of spaced apart radiant heating units between which the sheets of thermoplastic material are moved by the sheet supporting and transporting means for heating and softening sheets from both sides thereof.

10 Claims, 14 Drawing Figures

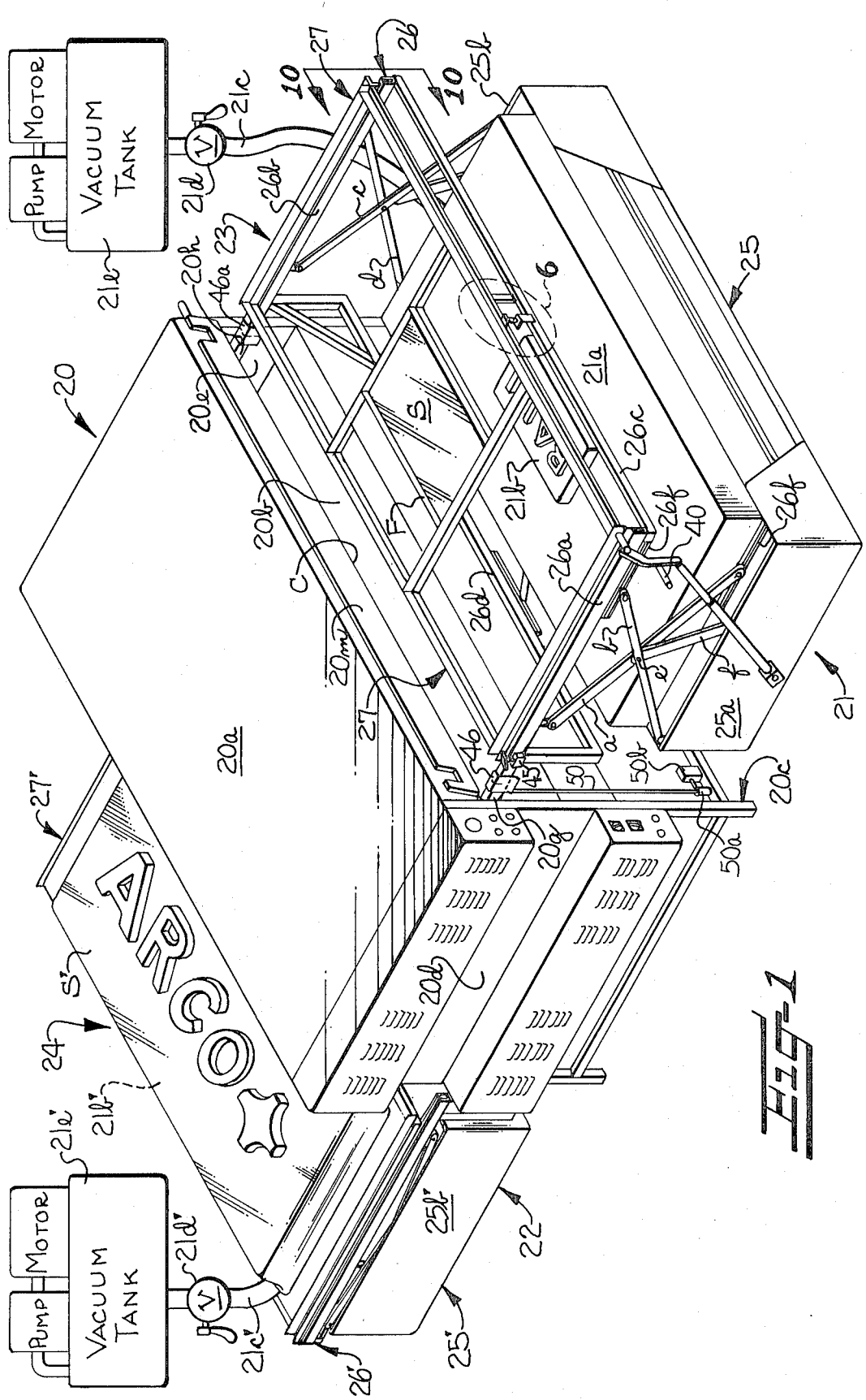

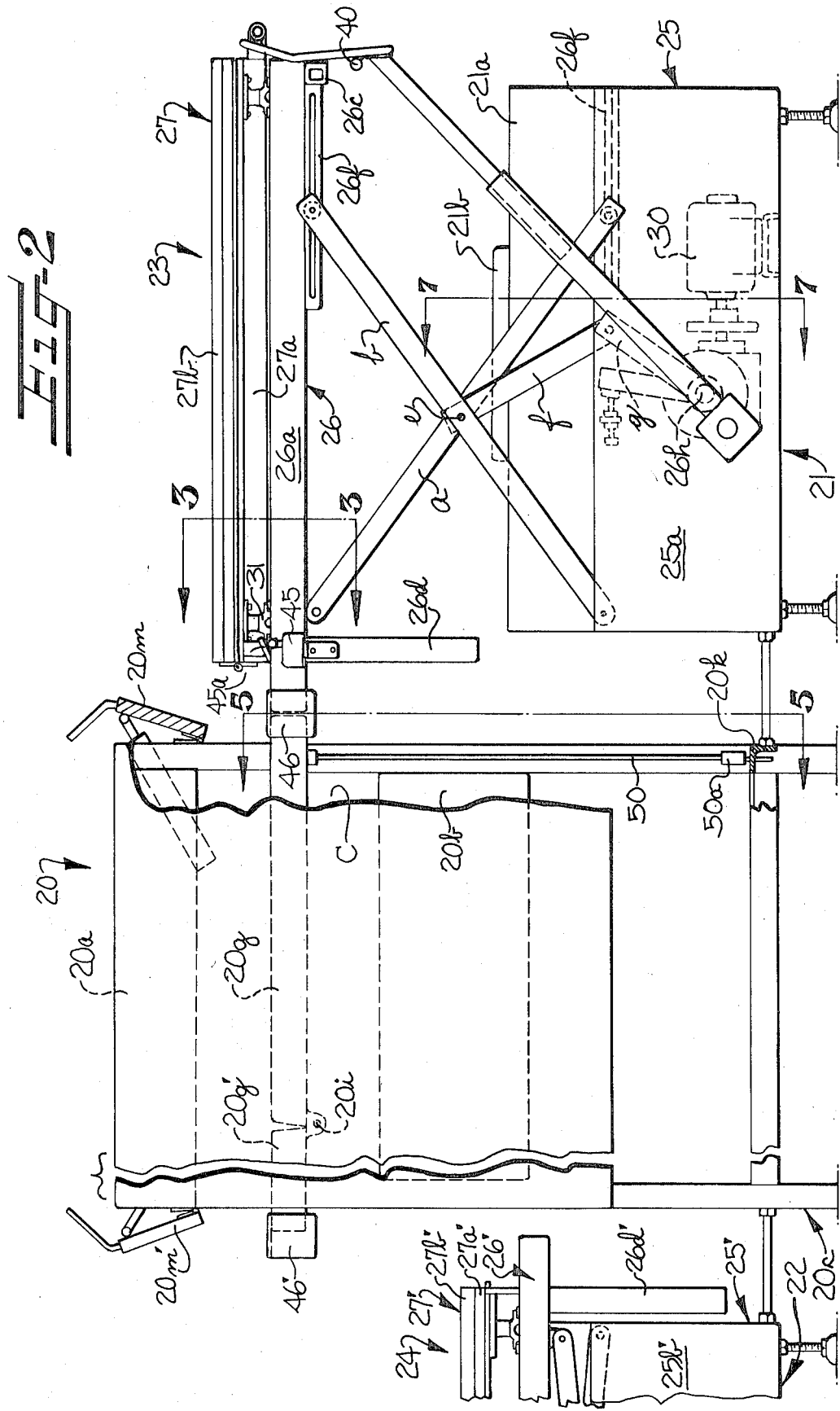

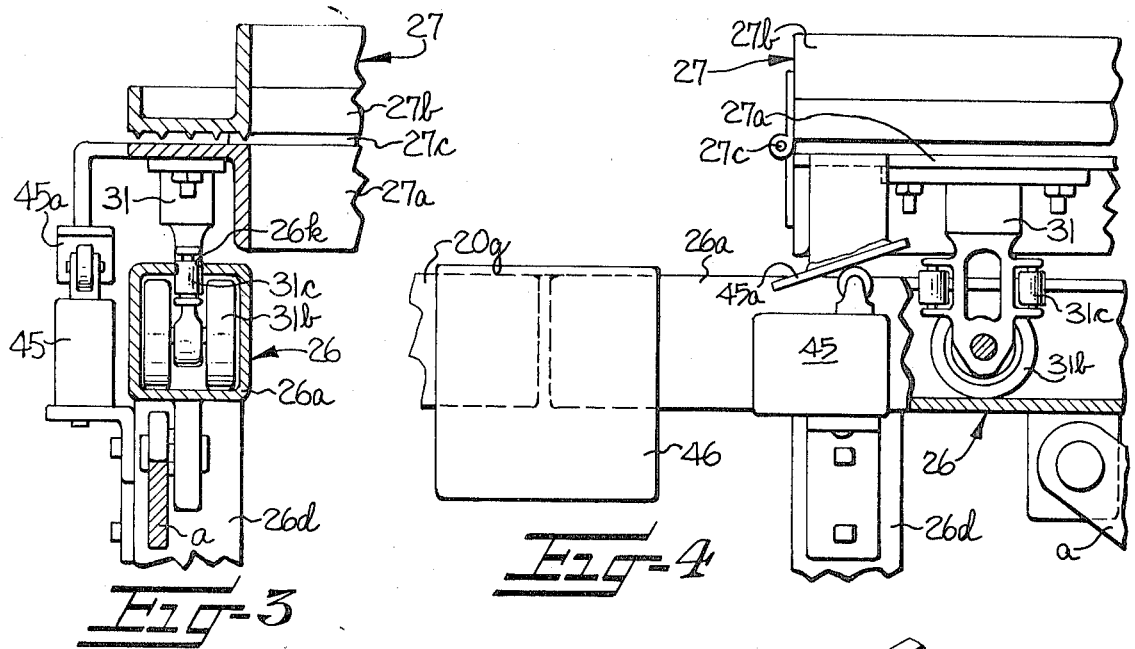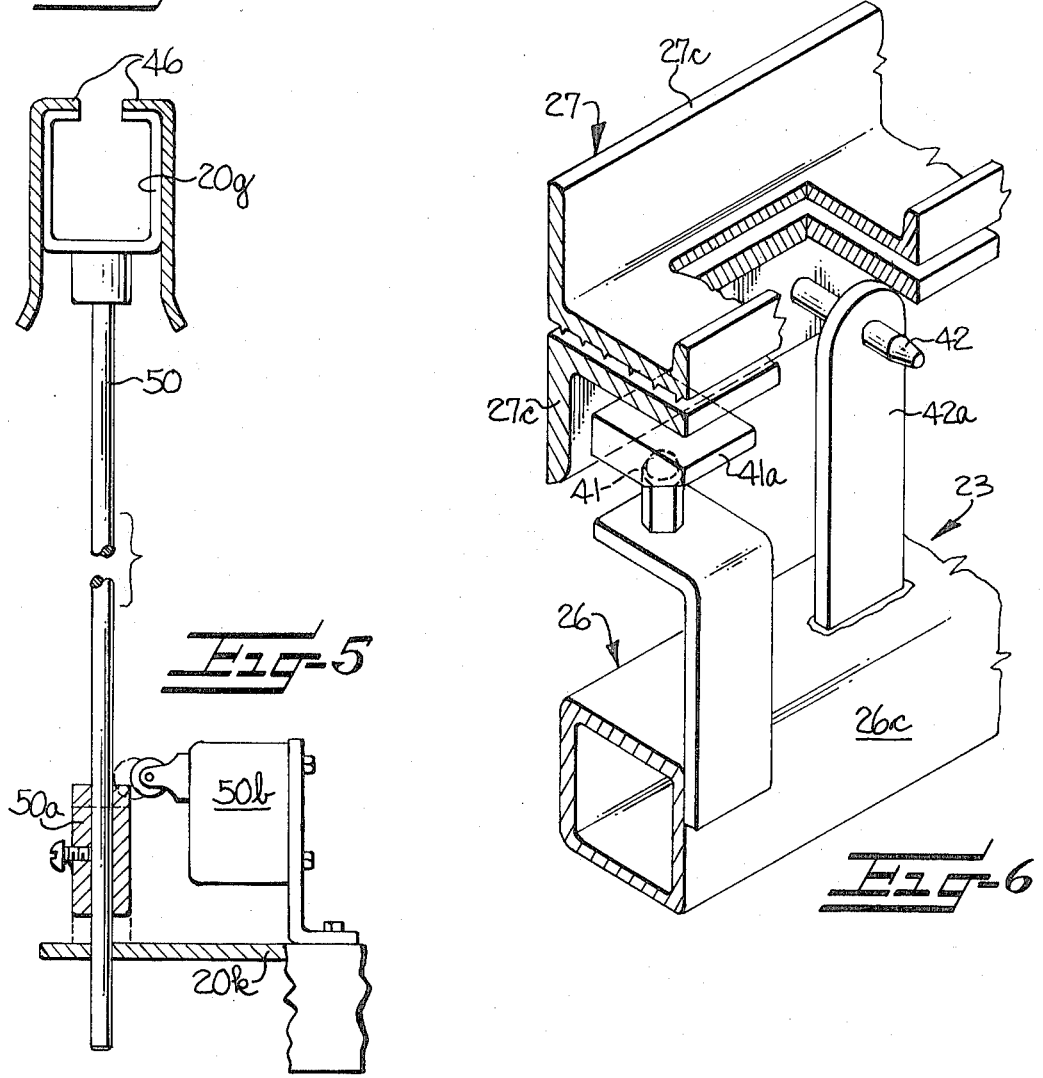

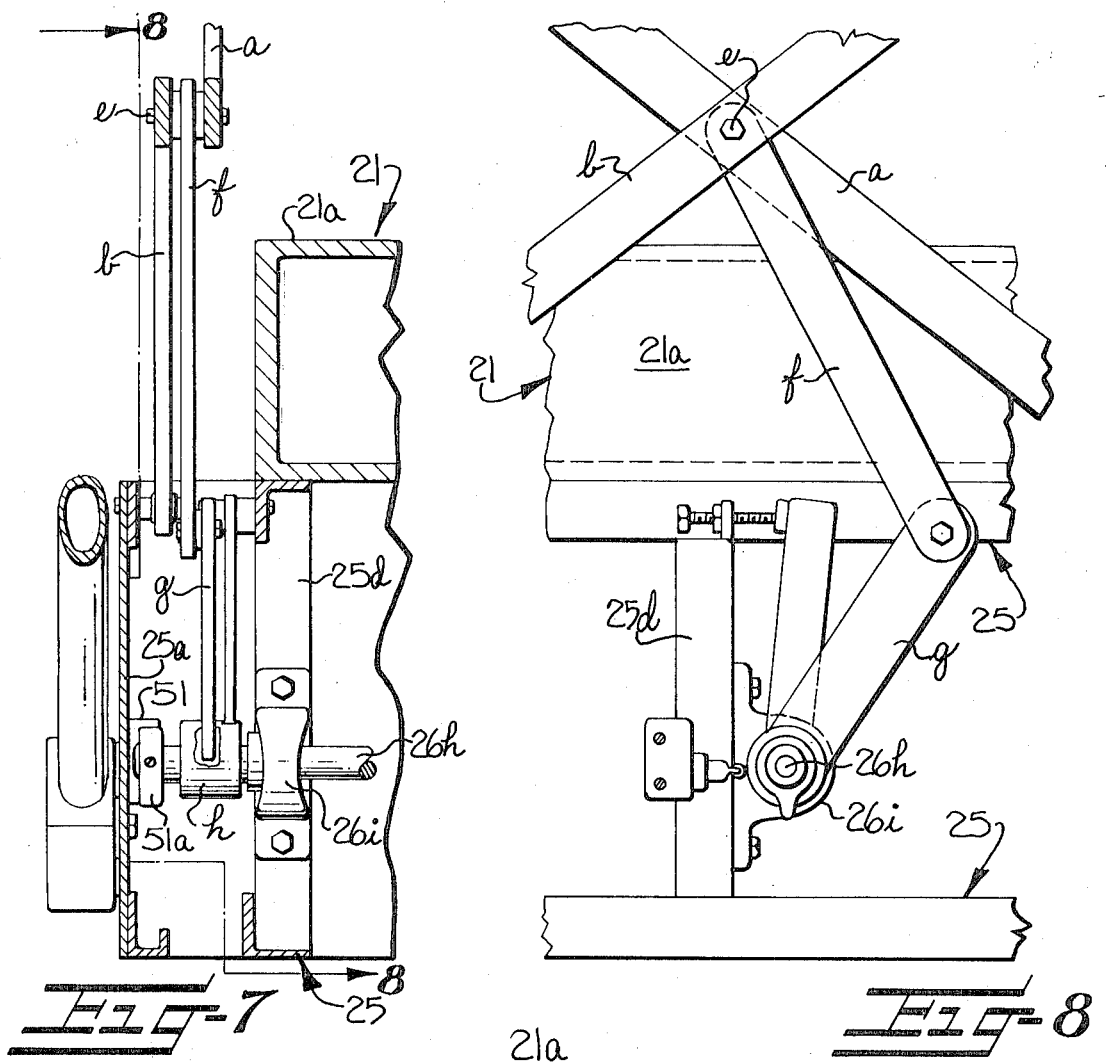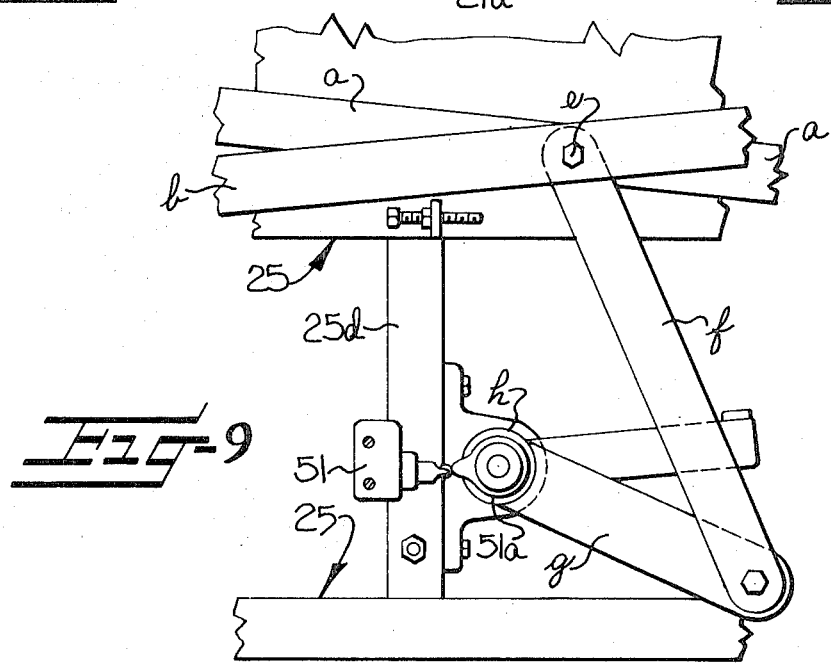

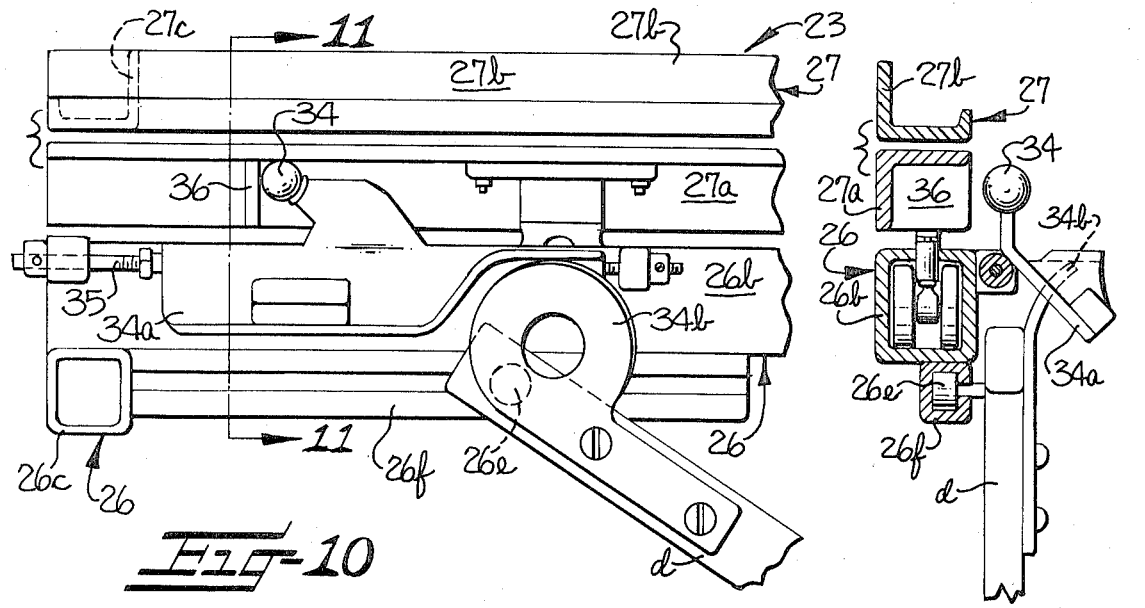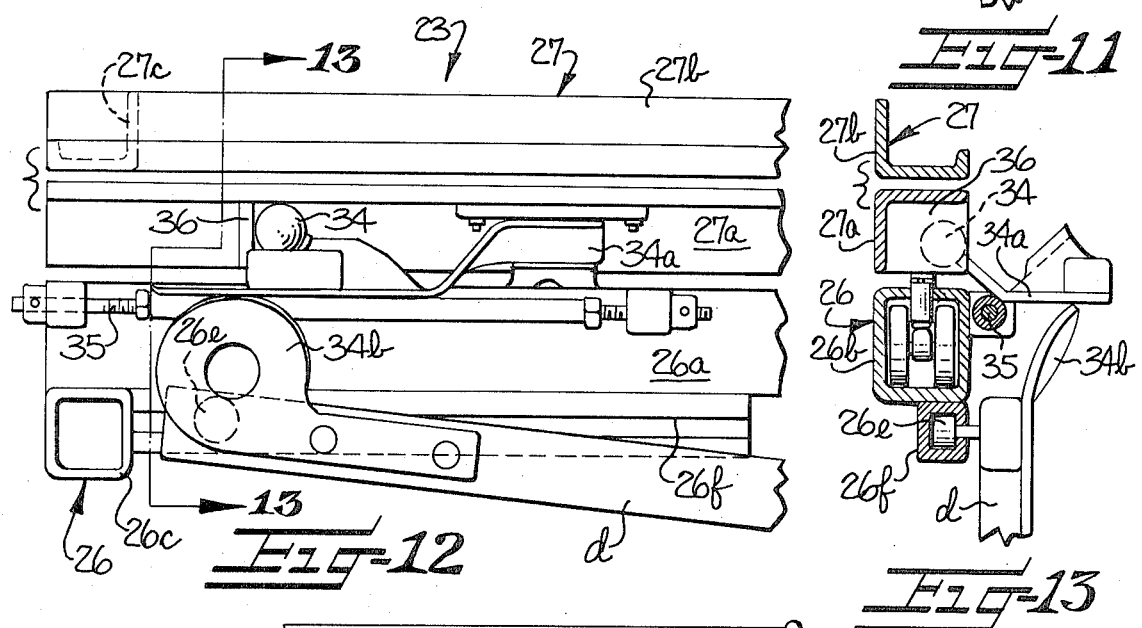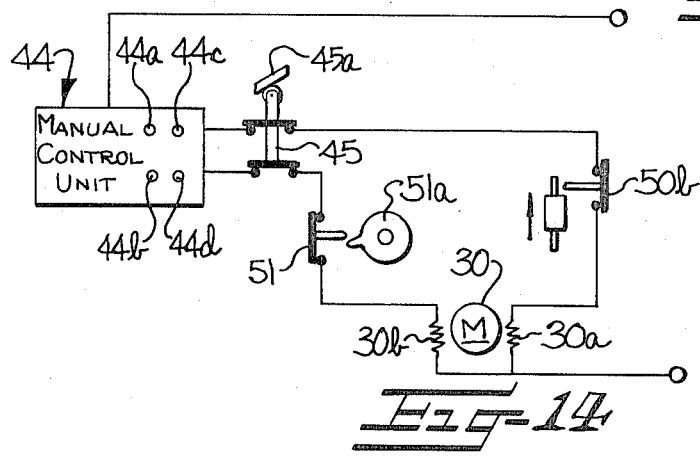

VACUUM FORMING APPARATUS

The present invention relates to an apparatus and method for vacuum forming sheets of thermoplastic material. Conventionally, vacuum forming apparatuses for sheets of thermoplastic material have employed a vacuum forming means and a heating means associated therewith a sheet supporting and transporting means for supporting a sheet of thermoplastic material and for moving the same into the heating means for heating and softening thereof and then on to the vacuum forming means for vacuum forming of the softened sheet of thermoplastic material. Heretofore, several problems and deficiencies have been encountered with such apparatus, since the time required for heating the sheet of plastic material is generally as long as the remainder of the cycle; i.e., while the sheet is disposed within the heating means the vacuum forming means is inoperative, and while the sheet is being vacuum-formed the heating means is out of use. This results in considerable inefficiency and considerably reduces the production of the apparatus. Previous attempts to overcome these problems and to obviate these deficiencies have not proven successful, since the apparatuses proposed by such attempts were complex and very expensive. One such previous proposal suggested the use of two forming stations with a common heating means but provided that the heating means be movable from a position overlying one of the forming means to another position overlying a second forming means. Such an apparatus, as can readily be appreciated, was extremely complex and difficult to operate as well as being very expensive.

With the foregoing in mind, it is an object of the present invention to provide an improved vacuum forming apparatus and method which obviates the problems and dificiencies of previous apparatuses by providing an apparatus wherein a single stationary heating means is employed with two vacuum forming means, with sheet transporting means for transporting sheets of plastic between the heating means and respective vacuum forming means in timed relationship.

Another object of the present invention is to provide a stationary heating means common to two vacuum forming means with the heating means disposed between the two vacuum forming means and with sheet supporting and transporting means for moving sheets into the heating means from opposite sides thereof for heating and then for moving the heated sheets into operative association with the respective vacuum forming means.

Another object of the present invention is to provide an apparatus and the method of the character described wherein a sheet of thermoplastic material may be heated and softened while another previously heated and softened sheet is being formed by a vacuum forming means while obviating the previous complexities and inefficiencies involved with previous machines.

Some of the objects of the invention having been stated, other objects will appear at the description proceeds, when taken in connection with the accompanying drawings, in which FIG. 1 is a perspective view of an apparatus embodying the present invention;

FIG. 2 is an enlarged fragmentary elevational view, partially in section, of the apparatus shown in FIG. 1;

FIG. 3 is an enlarged fragmentary sectional view taken substantially along line 3—3 in FIG. 2;

FIG. 4 is a fragmentary elevational view partially in section looking from the left in FIG. 3;

FIG. 5 is an enlarged fragmentary sectional view taken substantially along line 5—5 in FIG. 2;

FIG. 6 is an enlarged fragmentary perspective view, with portions broken away, of the area enclosed in the circle 6 in FIG. 1;

FIG. 7 is an enlarged fragmentary sectional view taken substantially along line 7—7 in FIG. 2;

FIG. 8 is a fragmentary elevational view of a portion of the machine looking substantially along line 8—8 in FIG. 7 and showing a portion of the sheet supporting and transporting means in a raised operative position;

FIG. 9 is a view similar to FIG. 8, but showing the sheet supporting and transporting means in a lowered operative position;

FIG. 10 is an enlarged fragmentary view taken substantially along line 10—10 in FIG. 1;

FIG. 11 is a fragmentary sectional view taken substantially along line 11—11 in FIG. 10;

FIG. 12 is a view similar to FIG. 10, but showing the parts in a different or lowered operative position;

FIG. 13 is a fragmentary sectional view taken substantially along line 13—13 in FIG. 12; and FIG. 14 is a schematic diagram of an electrical circuit for one of the sheet supporting and transporting means of the apparatus.

Referring more specifically to the drawings, the novel apparatus for carrying out the method of this invention comprises a heating means 20 (FIGS. 1 and 2), first and second vacuum forming means 21, 22, and first and second sheet supporting and transporting means 23, 24 for moving sheets of thermoplastic material between heating means 20 and the respective vacuum forming means 21, 22 for heating and softening the plastic sheets by the heating means and thereafter vacuum forming by the respective vacuum forming means 21, 22. The heating means 20 includes a pair of upper and lower spaced apart radiant heating elements or units 20a, 20b carried by a suitable frame 20c spaced between the first and second vacuum forming means 21, 22. The heating units 20a, 20b preferably are electrically heated with the space therebetween at opposite sides of the apparatus being closed by suitable closure plates 20d, 20e carried by a frame 20c and thereby to form a heating chamber or oven C between heating units 20a, 20b into which the sheets S, S' of thermoplastic material are moved by the sheet supporting and transporting means 23, 24 for heating and softening the respective plastic sheets S, S' from both sides thereof.

Since the second forming means 22 and the respective sheet transporting means 24 may be of essentially the same construction as the first forming means 21 and its respective sheet transporting means 23, only the first forming means 21 and its associated transporting means 23 will be described in detail and, where applicable, like reference characters will be applied to the elements of the second forming means 22 and its associated transporting means 24, with the prime notation added, to avoid repetitive description. The vacuum forming means 21 includes a vacuum table 21a whose substantially horizontally disposed upper forming surface is disposed substantially below the level of oven C and supports a suitable perforate vacuum mold 21b thereon from which air is partially evacuated through a tube 21c having a manual control valve 21d therein and leading to a suitable vacuum tank 21e. Conveniently, mold 21b is spaced below the level of the oven C defined by heating units 20a, 20b so as to be readily assessible to an operator, and vacuum table 21a is mounted on a suitable stationary frame 25 resting upon the floor upon which the frame 20c of the heating means 20 rests. Opposite sides of frame 25 are provided with suitable frame members or outboard plates 25a, 25b spaced outwardly from the vertical planes of opposite sides of vacuum table 21a to accommodate structure, to be presently described, for raising and lowering a substantially rectangular elevator means or frame 26 and a sheet clamping carriage 27 of the first sheet supporting and transporting means 23.

Elevator frame 26 comprises a pair of spaced, hollow, side rails or tracks 26a, 26b, to the outer and inner portions of which opposite ends of respective outer and inner or rear and front transverse frame members 26c, 26d are suitably secured. Inner transverse frame member 26b is of generally U-shaped form with the upper ends of the vertical legs thereof suitably secured to the respective side rails 26a, 26b adjacent the inner ends thereof.

Side rails 26a, 26b of elevator frame 26 are supported in a substantially horizontal position by respective pairs of cross bars a, b; c, d whose lower portions are mounted on frame 25 between the outboard plates 25a, 25b and table 21a. As shown, the inner ends of cross bars a, c are pivotally connected to side rails 26a, 26b, the inner ends of cross bars b, d are pivotally connected to the respective outboard plates 25a, 25d, and the outer end of each of the cross bars a–d is provided with a roller 26e (FIGS. 11 and 13) riding in a respective guide track 26f, there being one of the guide tracks 26f suitably secured to and depending from the lower rear portion of each side rail 26a, 26b, and there also being one of the guide tracks 26f suitably secured to opposite sides of the frame 25 of the sheet forming means 21 adjacent opposite sides of vacuum table 21a (FIGS. 1 and 2.) Each pair of cross bars a, b; c, d is pivotally interconnected intermediate its ends by a respective pivot shaft e to which the upper end of a respective link f is pivotally connected. As best shown in FIGS. 7–9, the lower portion of each link f is pivotally connected to a crank g having a hub h on its lower end suitably secured on the corresponding end of a transverse rocker shaft 26h whose opposite ends are located closely adjacent the proximal surfaces of outboard side plates 25a, 25b.

Rocker shaft 26h is journaled in suitable bearings 26a carried by respective substantially vertically disposed table supporting frame members 25d of the frame 25. Shaft 26h may be dirven in obverse and reverse directions, in alternation, by suitable connections with a reversible electric motor 30 controlled for semi-automatic operation in a novel manner to be later described. For the purposes of this disclosure, it may be assumed that the rocker shaft 26h rotates in an obverse or forward direction when it is rotated in a counter-clockwise direction in FIGS. 2, 8 and 9, and that rocker shaft 26h rotates in a reverse or rearward direction when it rotates in a clockwise direction in FIGS. 2, 8 and 9. It is apparent that, during obverse rotation of shaft 26h, the connections heretofore described between shaft 26h and elevator frame 26 impart upward movement to elevator frame 26 and, conversely, during reverse rotation of shaft 26h, the latter connections impart downward movement to frame 26.

The carriage 27 of the sheet supporting and transporting means 23 includes a pair of lower and upper, substantially rectangular clamping frames 27a, 27b hingedly interconnected at their rear or inner ends by suitable hinge means 27c (FIG. 4) and which normally occupy closed positions relative to each other and are clamped in such closed positions by suitable releasable clamping means, not shown. Essentially, the lower and upper clamping frames 27a, 27b may be constructed and operated in substantially the manner disclosed in my copending application Ser. No. 25,349, filed Apr. 3, 1970 and entitled CLAMPING FRAME FOR PLASTIC VACUUM FORMING MACHINE, and now U.S. Pat. No. 3,659,991, the disclosure of which is incorporated herein by reference. Accordingly, a more detailed description and illustration of the clamping frames 27a, 27b will not be given herein.

By way of illustration, however, it will be observed in FIG. 1 that different sizes of thermoplastic sheets S, S' are clamped in the respective carriages 27, 27', with the sheet S' being substantially larger than the sheet S and about the same size as carriage 27'. The clamping frames 27a, 27b of the first carriage 27 are modified, therefore, to accommodate the relatively smaller sheet S by providing a suitable intermediate rectangular framework F between the transverse bars of each clamping frame 27a, 27b in accordance with the size of the mold 21b. Of course, mold 21b is of substantially smaller size than mold 21b' in FIG. 1.

To facilitate guiding carriage 27 during manual movement thereof into and out of the oven C defined between heating units 20a, 20b and relative to elevator frame 26 when the latter occupies fully raised position, the four corner portions of lower clamping frame 27a are mounted on wheeled brackets whose wheels ride in the corresponding elevator side rails 26a, 26b. Each wheeled bracket may be arranged as in FIGS. 3 and 4 wherein the bracket 31 there shown is suitably secured to the lower surface of lower clamping frame 27a, extends downwardly therefrom through a relatively narrow slot 26k extending substantially throughout the entire length of the upper wall of the hollow side rail or track 26a of elevator frame 26, and has a pair of caster wheels or rollers 31b rotatably mounted thereon for rotation about a substantially horizontal axis within hollow side rail 26a. To limit vertical displacement of carriage 27 relative to elevator frame 26, it is preferred that the diameter of the wheels 31b is only slightly less than the distance between the upper and lower walls of side rail 26a. Additionally, relatively smaller rollers 31c are journaled for rotation on vertical axes in bracket 31 and are so positioned as to ride in engagement with the opposing walls of the slot 26k.

When elevator frame 26 occupies fully raised position, the front or inner ends of the side rails of 26a, 26b thereof, which normally project forwardly of the vertical plane of sheet clamping carriage 27, are substantially aligned with respective heater side rails or tracks 20g, 20h disposed adjacent to but are spaced inwardly from the proximal surfaces of the opposing side walls 20d, 20e of heating means 20. The heater side rails 20g, 20h are of substantially the same cross-sectional configuration and size as side rails 26a, 26b, and their ends remote from elevator frame 26 are pivotally supported on the heater side walls 20d, 20e, as at 20i in FIG. 2, at a point about halfway between the two clamping frames 26, 26'. A second heater side rail 20g' (FIG. 2) also is pivotally connected at 20i to each side wall 20d, 20e of heating means 20 and is substantially aligned with the inner end of each heater side rail 20g, 20h. Each second heater side rail 20g' extends outwardly remote from the corresponding side rails 20g, 20h and is arranged to accommodate the second sheet supporting and transporting means 24 in the same manner in which the side rails 20g, 20h accommodate the first sheet supporting and transporting means 23.

Restraining means are provided for maintaining carriage 27 in proper registration with elevator frame 26, as shown in FIGS. 1, 2, 10 and 12, during vertical movement of elevator frame 26, but which means releases carriage 27 when it occupies the fully raised operative position of FIGS. 1 and 2 so that the operator then may move carriage 27 along elevator side rails 26a, 26b and heater side rails 20g, 20h, 20g' into and out of the oven C of heating means 20. To this end, it will be observed in FIGS. 10–13 that a movable restraining member or latch 34 is positioned adjacent one side frame member of lower clamping frame 27a and is pivotally mounted on a substantially horizontal pivot shaft 35 suitable mounted on the outer wall of side rail 26b. An elongate scroll or serpentine cam 34a is suitably secured to or formed integral with latch 34. Cam 34a rests on and is raised to operative position by a sliding follower 34b fixed on the upper end portion of cross bar d, as will be presently described.

Cam 34a is so positioned and shaped that latch 34 is normally held, by the follower 34b, in an operative position closely adjacent the clamping frame 27a and immediately forwardly of a lateral abutment 36 on one side frame member of the lower clamping frame 27a, as in FIGS. 12 and 13. Latch 34 occupies the latter operative position at all times, except when elevator side rails or tracks 26a, 26b are substantially properly aligned with heater side rails or tracks 20g, 20h. Thus, during any vertical movement of elevator frame 26, and while elevator frame 26 is at rest in any position other than substantially fully raised position, latch 34 positively restrains carriage 27 from intentional or accidental forward movement, from right to left in FIGS. 1 and 2, relative to elevator frame 26. Elevator frame 26 and carriage 27 are shown occupying substantially their lowermost positions in FIGS. 12 and 13. Thus, follower 34b then occupies substantially its rearmost position adjacent rear transverse frame member 26c and in engagement with the low surface of cam 34a.

As shaft 26h is rotated to raise elevator frame 26, it is apparent that the rear ends of cross bars a–d move forwardly along the corresponding guides 26f. Thus, follower 34b slides along the relatively lower surface of cam 34a and maintains latch 34 in the operative position of FIGS. 12 and 13 until elevator frame 26 is raised to within a very short distance of its uppermost operative position. At that instant, follower 34b starts to move out of engagement with the relatively lower surface of cam 34a so that, by the time side tracks 26a, 26b are properly aligned with heater side tracks 20g, 20h (FIGS. 1 and 2) latch 34 will have moved out of the path of abutment 36 as the high surface of cam 34a rests against follower 34b. Thus, carriage 27 is released so that it may be moved into the oven or heating zone C between the heating units 20a, 20b xof heating means 20. A suitable handle means 40 is provided on the outer or rear end portion of carriage 27 to aid an operator in moving carriage 27 forwardly and rearwardly relative to heating means 20 and elevator frame 26.

As best shown in FIG. 6, carriage 27 also is yieldably held in withdrawn or rearmost position in proper registration with the respective vacuum forming means 21 and elevator frame 26 by means of a spring-loaded detent 41 carried by elevator frame 26 and engaging a suitable recess in a cam block 41a carried by a rear medial portion of lower clamping frame 27a. Additionally, a locator pin 42, carried by lower clamping frame 27a adjacent cam block 41a, loosely penetrates a member 42a on elevator frame 26 to aid in properly aligning carriage 27 with elevator frame 26 when carriage 27 occupies withdrawn position.

The semi-automatic control means for operating each elevator frame 26, 26' of the apparatus (FIGS. 1 and 2), may include a suitable manual control unit 44 (FIG. 14) provided with manually operable start switches 44a, 44b and respective stop switches 44c, 44d for controlling the flow of current to respective obverse and reverse windings or coils 30a, 30b of drive motor 30. A normally open safety switch 45 (FIGS. 1–4 and 14) is interposed between start switches 44a, 44b and the motor windings 30a, 30b so that motor 30 normally cannot be operated unless carriage 27 is properly located in fully withdrawn position over vacuum table 21a of forming means 21. Accordingly, safety switch is suitably mounted on elevator frame 26 as shown in FIGS. 2, 3 and 4 so as to be engaged and closed by an incline actuator 45a while carriage 27 occupies the withdrawn position of FIGS. 1–4. However, when carriage 27 is moved forwardly relative to elevator frame 26, actuator 45a is moved away from switch 45, permitting the same to open and thereby preventing operation of motor 30 in the event of an operator then actuating either of the start switches, 44a, 44b without closing switch 45.

In operation, the operator actuates start switches 44a, 44b, if it is desirable to raise or lower carriage 27 relative to forming table 21a, so that carriage 27 is positioned at a convenient, but lowered, position for placing the plastic sheet S therein. Upper clamping frame 27b then is swung upwardly about the hinge 27c (FIG. 4), plastic sheet S is placed on lower clamping frame 27a, and then upper clamping frame 27b is closed and clamped against lower clamping frame 27a to clamp the plastic sheet S in carriage 27. Thereupon, the operator actuates start switch 44a to energize obverse winding 30a thereby rotating rocker shaft 26h counterclockwise in FIGS. 2 and 9. Thus, cranks g, links f and cross bars a–d (FIGS. 1, 2 and 7–13) raise elevator frame 26 and carriage 27 to their uppermost operative positions as in FIGS. 1, 2, 4, 7, 8, 10 and 11.

As elevator frame 26 approaches the latter operative position, the front or inner end portions of side rails or tracks 26a, 26b engage and impart upward movement to respective elevator locating and guiding abutments 46, 46a (FIG. 1) suitably secured to and projecting outwardly from heater side rails or tracks 20g, 20h. Thus, elevator frame 26 raises the adjacent ends of heater side rails 20g, 20h xa relatively short distance which is effective to stop motor 30. To this end, it will be observed in FIGS. 1 and 5 that the free end portion of each heater side rail 20g, 20h has the upper end of a post 50 attached thereto whose lower portion is guided for vertical movement in a lower transverse frame member 20k of the frame 20c of heating means 20. A support block 50a is mounted for vertical adjustment on post 50 and normally rests upon frame member 20k so as to support the free end of the corresponding heater side rail when the abutments 46, 46a are not resting upon the elevator side tracks 26a, 26b.

It is apparent, therefore, that each support block 50a is lifted off of frame member 20k as elevator frame 26 lifts the free ends of the heater side tracks 20g, 20h by engagement thereof with the abutments 46, 46a. In so doing, at least one of the support blocks 50a moves upwardly against and opens a normally closed limit switch 50b (FIGS. 5 and 14) in the electrical circuit between safety switch 45 and the obverse winding 30a of motor 30 to stop the same.

Since latch 34 (FIGS. 10–13) occupies the inoperative position of FIG. 11, as heretofore described, when elevator frame 26 occupies fully raised, operative, position, the operator then moves carriage 27 into the heating zone or oven C between heating units 20a, 20b. Suitable hinged doors 20m, 20m' (FIG. 2) are mounted on opposite ends of heating unit 20a for closing the oven C while either carriage 27, 27 is disposed within the oven. In fact, doors 20m, 20m' need be opened only during movement of the respective carriages 27, 27' into and out of the heating means 20. The depth of oven C between doors 20m, 20m' may be only slightly greater than the width of each carriage 27, 27'.

While the first carriage 27 is disposed within heating means 20, the second carriage 27' may be prepared for positioning the same in heating means 20 in substantially the same manner as that described with respect to the first carriage 27. After opposite sides of the plastic sheet S have been subjected to the radiant heat from heating units 20a, 20b for a sufficient period of time; e.g., about two to three minutes, to soften the plastic sheet S so that it will readily conform to the mold 21b, the operator opens the door 20m for a sufficient length of time to withdraw carriage 27 until it is in proper registration with elevator frame 26 and the mold 21b therebeneath, thus closing safety switch 45 (FIGS. 2, 3, 4 and 14). The operator then may close the door 20m.

The operator then actuates manual switch 44b of FIG. 14 to energize the reverse winding 30b of motor 30 through a second normally closed limit switch 51 (FIGS. 8, 9 and 14) mounted on vacuum table frame 25 adjacent rocker shaft 26h. Motor 30 then rotates rocker shaft 26h to lower elevator frame 26 and carriage 27 until plastic sheet S (FIG. 1) is in upper engagement with mold 21b. At this instant, an actuator or cam 51a, which is angularly adjustable on shaft 21h (FIGS. 8 and 9), engages and opens limit switch 51 to again stop the motor 30. Valve 21d (FIG. 1) is then manually opened to evacuate air from mold 21b and cause plastic sheet S to losely conform to the shape of mold 21b in a known manner.

Cam 51a is adjustable so that the position to which carriage 27 is lowered by motor 30 may be adjusted to accommodate molds of differing thicknesses or heights on table 21a. It is apparent that the manual control unit 44 may include well known forms of electrical components for interrupting the flow of current to the respective windings 30a, 30b of motor 30 when the stop switches 44c, 44d are manually actuated following actuation of the respective start switches 44a, 44b and so that the operation of motor 30 may be interrupted at any time during vertical movement of elevator frame 26. Also, such electrical components should be capable of stopping the flow of current to windings 30a, 30b through the respective limit switches 50b, 51 once the latter switches have been opened following manual actuation of the respective start switches 44a, 44b. Since such electrical components and related circuitry associated with the manual control unit 44 are generally well-known to experienced electricians trained in the installation and operation of holding circuits and circuit makers and breakers, a further illustration and description of the electrical circuit is deemed unnecessary.

From the foregoing description, it can be appreciated that, according to the method of this invention, the first sheet of plastic material S is prepared for heating and softening by positioning the same in the clamping carriage 27 while it occupies a relatively lowered position with respect to heating means 20 and then by actuating the motor 30 to operate in the obverse direction and raise the elevator frame 26 and carriage 27 to the uppermost operative position, whereupon carriage 27 is moved into the heating means 20 between the radiant heating units 20a, 20b, wherein the plastic sheet S is heated from both sides thereof to soften the same. While the first plastic sheet S is being heated, a second plastic sheet S' is prepared for heating and softening of the same by clamping the second sheet S' in the second clamping carriage 27' (FIGS. 1 and 2) while the latter occupies a relatively lowered position with respect to the heating means 20. Also, the second plastic sheet S' is further prepared by raising the second elevator frame 26' and the second carriage 27' in essentially the same manner as that described with respect to the first elevator frame 26 and carriage 27.

After the first plastic sheet S has been heated and softened in the heating means 20, it is moved to the vacuum forming means 21 and the second sheet S' is moved into the heating means 20. The heated and softened first sheet S is vacuum formed on the vacuum mold 21b while the second sheet S' on carriage 27' is being heated and softened in the heating means 20, and after the first sheet S is removed from the mold 21b and from the clamping carriage 27, a third sheet is prepared for heating and softening the same in the manner heretofore described while the heating and softening of the second sheet S' may continue, thus providing a highly efficient method and apparatus for vacuum forming successive sheets of thermoplastic material. It is thus seen that the first and second sheet supporting and transporting means 23, 24 are operable in timed relation to each other for transporting the plastic sheets S, S' into heating means 20 for heating and softening thereby and then into operative association with the respective vacuum forming means 21, 22 for forming the sheets S, S'. It is apparent that valves 21d, 21d' (FIG. 1) are manipulated at the proper times to suck the heated and softened plastic sheets S, S' against the respective molds 21b, 21b' and to interrupt the vacuum or suction for releasing the thus formed plastic sheets. Of course, while valve 21d is open, the first carriage 27 occupies fully lowered, operative, position and the second carriage 27 may be within heating means 20 or in the course of removal from or preparation for insertion in heating means 20 with valve 21d' closed. Also, while valve 21d' is open, the second carriage 27' occupies fully lowered operative position and the first carriage may be within heating means 20 or in the course of removal from or preparation for insertion in heating means 20 with 21d closed. Generally, the plastic sheets quickly conform to the molds and set in a relative short period of time as compared to the time required to soften the plastic sheets in the heating means. Therefore, it is preferred that while one carriage is within the heating means 20, the other carriage occupies the lowered operative position, the plastic sheet on the other carriage is vacuum formed and then replaced with a new plastic sheet, and the latter carriage is elevated to the raised operative position ready for insertion into the heating means 20 before the previously heated and softened sheet on said one carriage is removed from the heating means. The latter carriage is then lowered to the lowered operative position, the corresponding valve 21d or 21d' is opened, and then the other, previously raised, carriage is inserted in heating means 20 to heat and soften the plastic sheet therein.

In the drawings and specification there has been set forth a preferred embodiment of the invention and, although specific terms are employed, they are used in a generic and descriptive sense only.

That which is claimed is:

1. An apparatus for vacuum forming sheets of thermoplastic material comprising
   stationary heating means for receiving, heating, and softening only a single sheet of thermoplastic material at any one time,
   first vacuum forming means positioned adjacent said heating means for vacuum forming softened sheets of thermoplastic material brought into operative association therewith,
   first sheet supporting and transporting means operatively associated with said first vacuum forming means and said heating means for supporting a sheet of thermoplastic material and transporting the same into and out of said heating means along a first direction and into operative association with said first vacuum forming means,
   second vacuum forming means positioned adjacent said heating means and laterally spaced from said first vacuum forming means for vacuum forming a softened sheet of thermoplastic material brought into operative association therewith, and
   second sheet supporting and transporting means operatively associated with said second vacuum forming means and said heating means for supporting a sheet of thermoplastic material and transporting the same into and out of said heating means along a second direction and into operative association with said second vacuum forming means,
   whereby said apparatus may be cyclically operated by heating and softening a first sheet while another previously heated and softened sheet is being vacuum formed on one of said first and second vacuum forming means, and then vacuum forming the first sheet on the other of said first and second vacuum forming means while another sheet is being heated and softened.

2. The apparatus as defined in claim 1 wherein said first and second sheet supporting and transporting means are positioned to transport the supported sheet into said heating means at substantially the same elevation such that only one supported sheet may be positioned in said heating means at the same time.

3. Apparatus according to claim 1, wherein said heating means comprises at least one generally horizontally disposed, radiant heater, and said first and second vacuum forming means each includes a generally horizontal forming surface adapted to support a forming mold thereon.

4. Apparatus according to claim 3, wherein said heating means is positioned at a higher elevation than each of said forming surfaces of said first and second vacuum forming means, and each of said first and second sheet supporting and transporting means includes means for transporting the sheets horizontally into and out of said heating means and vertically into and out of operative association with the associated vacuum forming means.

5. Apparatus according to claim 1, wherein said heating means is positioned between said first and second vacuum forming means and said first and second sheet supporting and transporting means transport the supported sheet into said heating means from opposite directions.

6. Apparatus according to claim 1, wherein each of said first and second sheet supporting and transporting means includes clamping frame means for clampingly supporting a sheet of thermoplastic material around the periphery thereof, and means mounting said clamping frame means for movement between said heating means and the corresponding vacuum forming means.

7. Apparatus according to claim 6, wherein said heating means and each of said first and second vacuum forming means are substantially horizontally disposed and said mounting means for said clamping frame means of each of said first and second sheet supporting and transporting means mounts said clamping frame means for vertical movement into and out of operative association with the corresponding vacuum forming means and for horizontal movement into and out of said heating means.

8. Apparatus according to claim 7, including means for moving each of said clamping frame means of each of said first and second sheet supporting and transporting means vertically between a lowered position in operative association with the corresponding vacuum forming means and a raised position for movement into and out of said heating means.

9. Apparatus according to claim 1, wherein said heating means comprises substantially vertically spaced lower and upper radiant heating units defining a heating chamber therebetween located between and above the level of each of said first and second vacuum forming means, and wherein each of said first and second sheet supporting and transporting means comprises an elevator frame, a substantially horizontal clamping carriage for clamping one of said sheets of thermoplastic material therein and guided for movement into and out of said heating chamber on and relative to said elevator frame, means for raising and lowering said elevator frame with said carriage thereon in a path over the respective vacuum forming means between a lowered position closely adjacent said respective forming means and a raised position substantially horizontally aligned with said heating chamber whereby said carriage may be moved into and out of said heating chamber relative to said elevator frame while the latter occupies said raised position, and the range of movement of said elevator frame being such as to lower the sheet and said carriage thereon into engagement with said respective forming means.

10. Apparatus according to claim 9, including releasable restraining means between said elevator frame and said carriage of each of said first and second sheet supporting and transporting means for restraining said carriage against relative movement with respect to said elevator frame while said carriage is in substantially vertical alignment with said vacuum forming means and during movement of said elevator frame in said path over the respective vacuum forming means.

* * * * *

UNITED STATES PATENT OFFICE
CERTIFICATE OF CORRECTION

Patent No. 3,814,562         Dated June 4, 1974

Inventor(s) Harvey J. Diamond

It is certified that error appears in the above-identified patent and that said Letters Patent are hereby corrected as shown below:

Column 3, Line 7, "assessible" should be --accessible--;
Column 3, Line 34, "25d" should be --25b--;
Column 3, Line 53, "26a" should be --26i--;
Column 3, Line 56, "dirven" should be --driven--;
Column 6, Line 1, "xof" should be --of--;
Column 6, Line 66, "xa" should be --a--;
Column 7, Line 54, "upper" should be --proper--;
Column 9, Line 7, before "21d" insert --valve--.

Signed and sealed this 17th day of September 1974.

(SEAL)
Attest:

McCOY M. GIBSON JR.
Attesting Officer

C. MARSHALL DANN
Commissioner of Patents